C. WINEGAR.
Gate.
No. 22,261.
Patented Dec. 7, 1858.
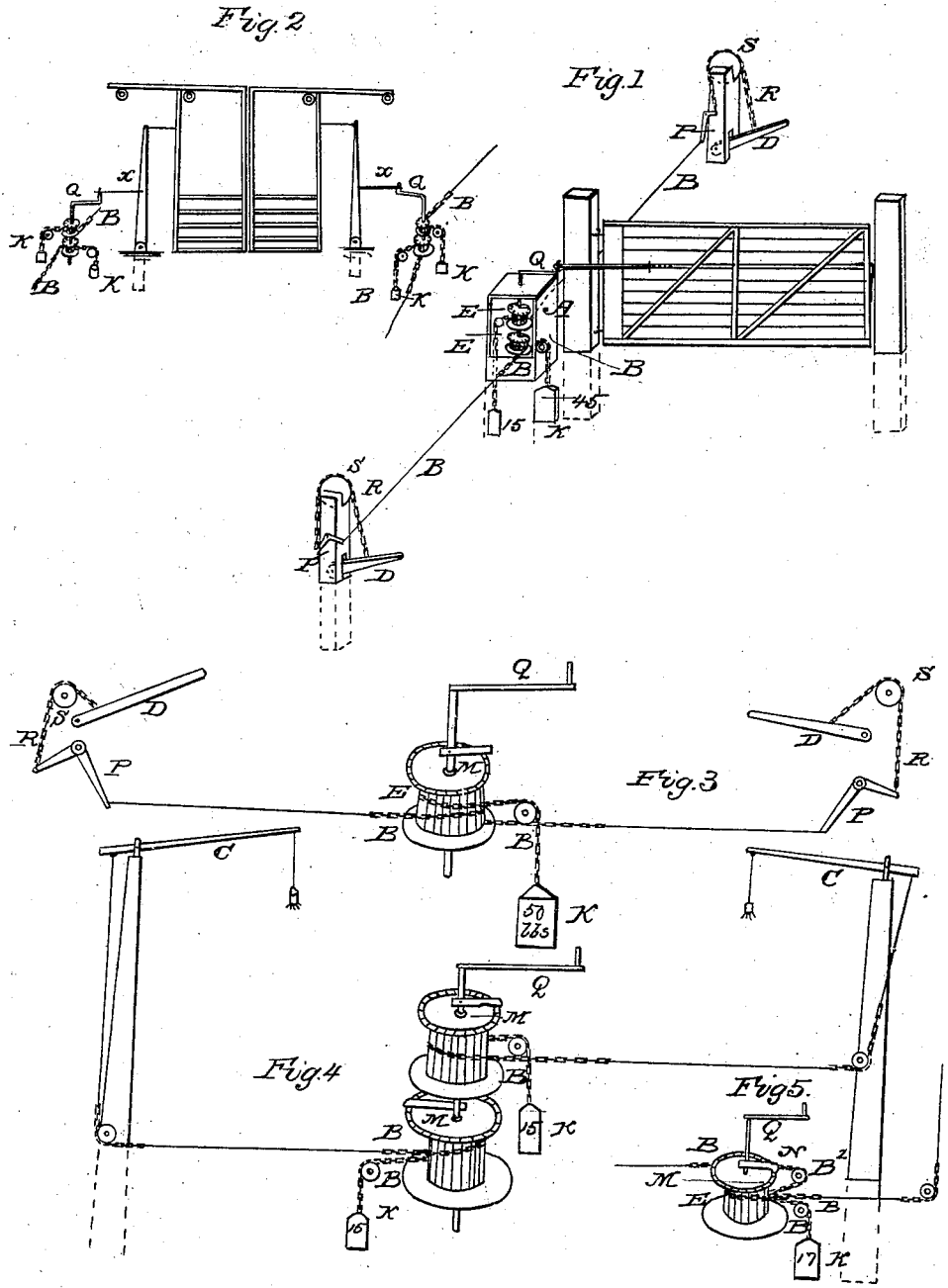

UNITED STATES PATENT OFFICE.

CALEB WINEGAR, OF UNION SPRINGS, NEW YORK.

MODE OF OPENING AND CLOSING FARM-GATES BY APPROACHING VEHICLES.

Specification of Letters Patent No. 22,261, dated December 7, 1858.

*To all whom it may concern:*

Be it known that I, CALEB WINEGAR, of the village of Union Springs, in the county of Cayuga and State of New York, have invented new and useful Improvements on Winegar's Capstan Farm-Gate, patented to him August 26, 1856; and I do hereby declare that the following is a full and exact description of the operation and construction of the same, reference being had to the annexed drawings, making a part of this specification.

Figure 1 is a perspective view of its application to a swinging gate to be operated by carriage wheels; Fig. 2 its application to sliding or rolling gates; Fig. 3 is a view of the capstan roller weights and treadle upon which the carriage wheel passes. Fig. 4 represents an enlarged view of the manner of operating gates, with two fluted capstan rollers, and Fig. 5 represents where but one fluted capstan roller E is used and one weight; one chain passes around the capstan roller and another chain is united with the chain and is carried around the grooved roller N, back to the other post, while the other chain passes on direct.

Like letters refer to like parts in all the figures.

In the patent granted to me August 26th, 1856, the crank could pass but one way and in case the gate was opened or closed by hand and the crank should turn the center the wrong way something must break and consequently very much injure its usefulness. The chains were fastened firmly to the ratchet drum or capstan roller while in the present plan the chains B are only passed around two capstan rollers E—E, Fig. 4, and weights 15—15 or an equivalent spring for each, the weights being sufficiently heavy to hold the chain tight enough to operate the gate without slipping. And when the weights rest upon the bottom of the box it slacks the chain so that the crank can be turned either way without disarrangement or breakage. I also fasten the ratchet dog M to the crank shaft Q to avoid the use of a spring.

Fig. 3 represents the manner of operating gates whether rolled horizontally as in Fig. 2 or swung as in Fig. 1. In this plan the chains are put on in a reversed manner, but one capstan roller is used and but one weight. The chains are made fast to the capstan drum, the wheels of the carriage pass over the lever or treadle D, draw the chain B and elevate the weight K marked 50 lbs., which is sufficiently heavy to open or close the gate with sufficient force. And when the wheel leaves the lever the said weight acts upon the capstan roller, the ratchet dog M takes effect and the crank Q is rotated and the gate opened and closed by means of the pitman X, &c., in the usual manner. In this plan the weight or equivalent spring opens or closes the gate. The great advantage is very apparent, where a gate is operated by the weight of the carriage or animal. A loaded two horse wagon or a light sulky passing over the treadle the effect is the same, and it does not matter how quick the weight or spring is operated, the gate being operated by the weight or spring, it has but one motion. In practice it works so perfect that a team can be driven through a gate on a trot. In this plan the weight is wound up by passing over the treadle D every time the carriage passes. The weight can also be elevated with the usual high parts and levers by hand and a gate opened or closed in that way, or both plans may be combined in one.

Now what I claim as my invention and desire to secure by Letters Patent is—

1. The combination only, of two or more capstan rollers, substantially as described.

2. The operating of gates by means of winding up the weight or equivalent spring with the wheel of a carriage or by lever each time in passing and repassing the gate sufficient to open or close the gate or gates substantially as described.

CALEB WINEGAR.

Witnesses:
THOMAS J. MERSEREAU,
GEORGE W. WINEGAR.